June 12, 1962  K. W. BAGNALL ETAL  3,038,787
EQUIPMENT FOR HANDLING DANGEROUS SUBSTANCES
Filed Feb. 23, 1960  5 Sheets-Sheet 3

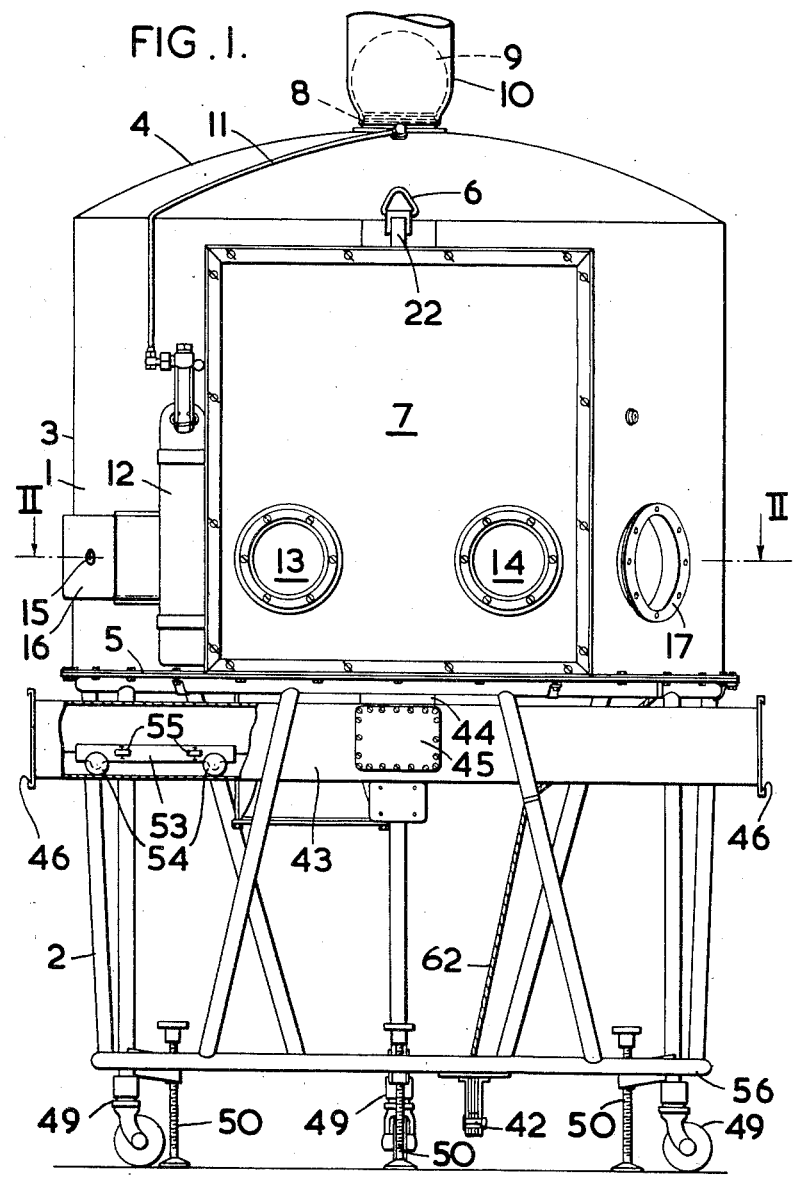

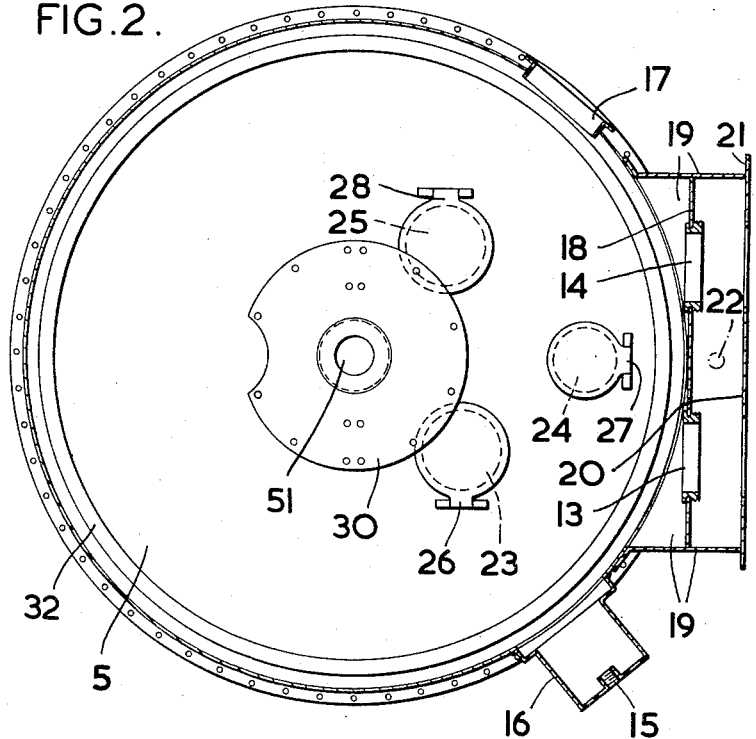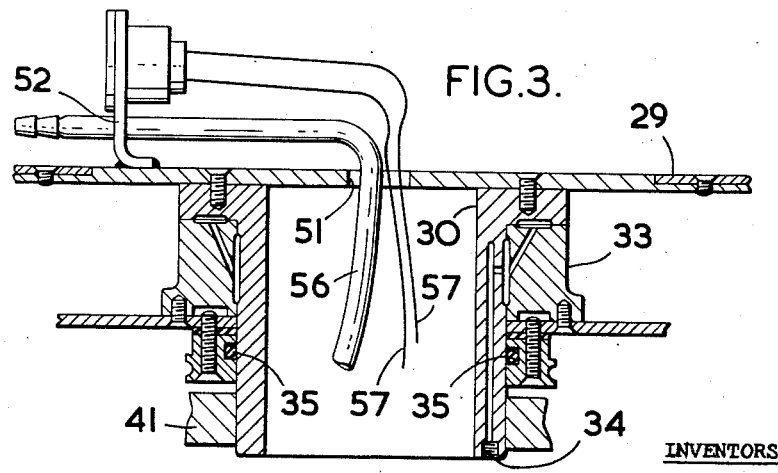

INVENTORS
KENNETH WINFIELD BAGNALL
DANIEL STEWART ROBERTSON

BY

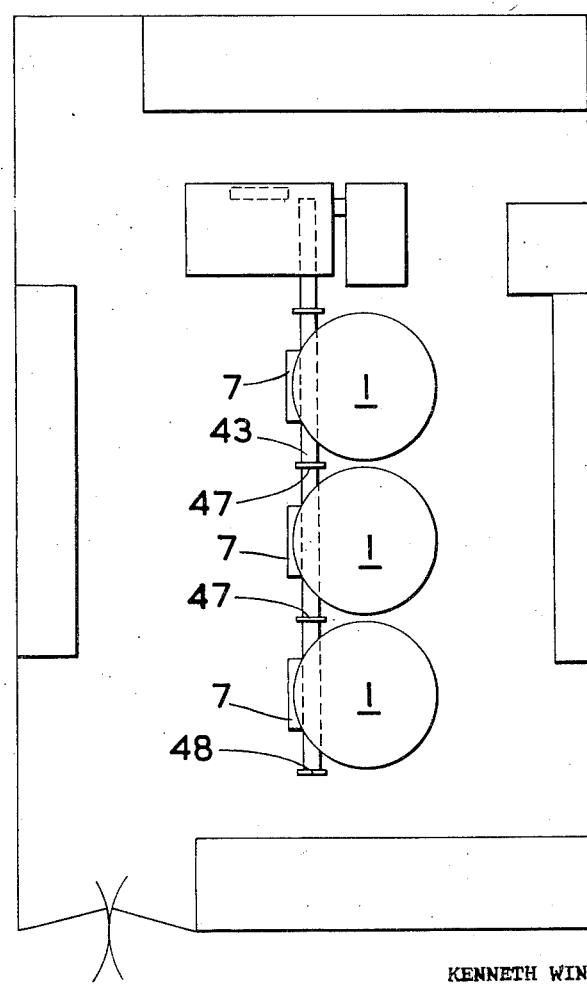

United States Patent Office 3,038,787
Patented June 12, 1962

3,038,787
EQUIPMENT FOR HANDLING DANGEROUS SUBSTANCES
Kenneth Winfield Bagnall, Harwell, and Daniel Stewart Robertson, Spittal, Berwick-on-Tweed, England, assignors to United Kingdom Atomic Energy Authority, London, England
Filed Feb. 23, 1960, Ser. No. 10,114
Claims priority, application Great Britain Mar. 3, 1959
6 Claims. (Cl. 23—259)

This invention relates to equipment for use in carrying out operations on, or treatments to a toxic substance.

According to the present invention, equipment for use in carrying out operations on or treatments to a toxic substance comprises a gas tight chamber substantially circular in plan, a window of transparent substance in the wall of the chamber, glove-ports in the window, a table within the chamber below the level of the glove-ports and is characterised in that a port is provided in the table and ports are provided in the base plate of the chamber with which said port in the table may be brought into register by relative rotation of the table and the chamber whereby articles or substances can be introduced or withdrawn from the chamber through said ports when in register.

The chamber may be provided with a horizontally extending passageway which is adapted to be attached to the underside of the base plate of the chamber and which registers with a port in the said base plate.

A preferred embodiment of the invention will now be described by way of example with reference to the accompanying drawings.

In the drawings:

FIG. 1 is a part sectional front elevation of a gas tight chamber and its supporting stand.

FIG. 2 is a sectional plan on the line II—II of FIG. 1 with the turntable removed.

FIG. 3 is a sectional elevation of the turntable bearing assembly.

FIG. 8 is a diagrammatic plan of a series of chambers arranged in a laboratory.

Figure 4:
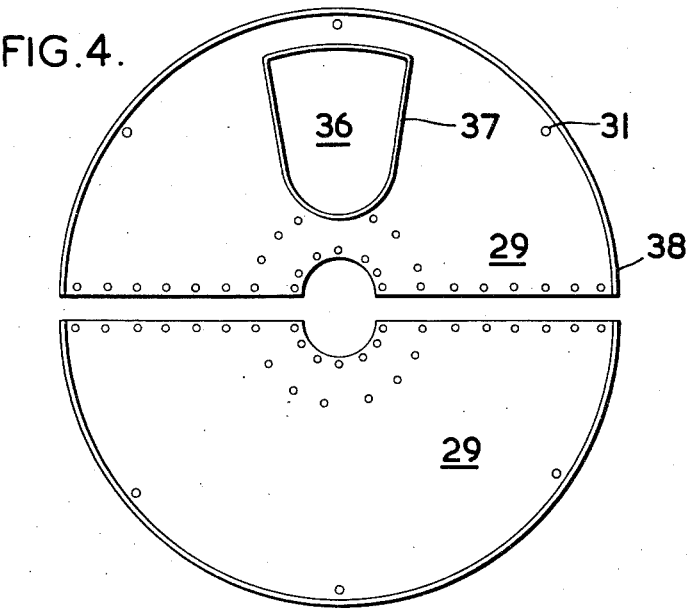
FIG. 4 is a plan of the turntable.

As shown in FIGS. 1 and 2 a gas tight chamber 1 which is supported on a tubular steel framework 2, comprises a cylindrical shell 3 closed at its upper end by a domed roof 4 of convex configuration and at its lower end by a plane circular base-plate 5.

Two lifting eyes 6 are provided on the roof at the ends of the diameter normal to a viewing window 7; an explosion port 8 is fitted at the centre of the convex roof and this consists of a circular port on which rests a rubber beach ball 9. The latter is contained inside a plastic (PVC) sleeve 10 which is connected to the laboratory extract system (not shown). When the chamber 1 is pressurised above approximately 1 inch water gauge, the ball 9 lifts, releasing the pressure. The lead 11 from a $CO_2$-type fire extinguisher 12, which is clipped to the wall adjacent to the viewing window, enters the chamber close to the explosion port.

The plane viewing window 7 in which two glove ports 13 and 14 are fixed is placed along a tangent to the chamber walls. Four permanent reagent (not shown) leads extend into the chamber through the roof above the viewing window.

A venturi air-ejector (not shown) secured to the outer surface of the chamber, extracts air from within the chamber via an aperture 15 in the chamber wall and a filter for the air so extracted is fitted inside the chamber and is contained in a close fitting box 16 welded on to the wall on the left hand side of the viewing window 7.

A port 17 referred to as a posting port is arranged in the wall on the side opposite to the filter; this permits the posting in of new equipment.

The window 7 is double glazed in order to guard against the accidental release of radioactivity into the laboratory. The inner pane 18, in which the glove-ports 13 and 14 are fixed, is held against a neoprene gasket on an extension 19 to the wall of the box by means of countersunk head set screws. The outer window 20 is bolted on to a wide flange 21 welded to this window extension; the flange 21 is provided so that the chamber can be attached to an opening in the wall of a frog-suit area for decontamination or repair.

The space between the two panes 18 and 20 is maintained under slightly reduced pressure by applying suction to a pipe 22 at the top of the said space and the exhaust from this is fed into an extract duct (not shown). There is therefore a continuous flow of ambient air through the space between the window panes 18 and 20, so that any radioactive particles which may escape from the chamber 1, in the region of the window will mostly be carried up into the extract system.

A number of access ports comprising a centrifuge posting port 23 a communication port 24 and a trash disposal port 25 are formed in the base plate 5 and are adapted to be covered by hinged lids 26, 27 and 28 respectively.

Referring now also to FIGS. 3 and 4 a turntable 29 inside the chamber 1, is mounted on a flanged central rotatable member 30 and is supported on castors 31 spaced evenly round the periphery. These castors run on a circular strip 32 placed on the upper face of the base plate 5 and may be unscrewed from the turntable 29 for servicing inside the chamber.

The central member 30, which also bears the service leads, rotates on an aluminum bronze sleeve bearing 33 which is secured to the upper face of base plate 5. Bearing 33 is provided with grease channels in its vertical and horizontal surfaces, the grease being supplied by a screw-up greaser 34 fitted to the end surface of member 30 which projects below the base plate 5. The bearing is sealed against leakage of radioactive dust by an O-ring seal 35 positioned below the base of the chamber, in such a manner that the seal 35 can be replaced without risk of an escape of radioactivity.

Since the bearing will ultimately require servicing, the turntable 29 is made divisible along a diameter, the two halves being connected by fastening them on to metal T-section ribs. A sector shaped hole 36 is cut out of the turntable 29 to permit access to ports 23, 24 and 25 in the base-plate.

Figure 5:
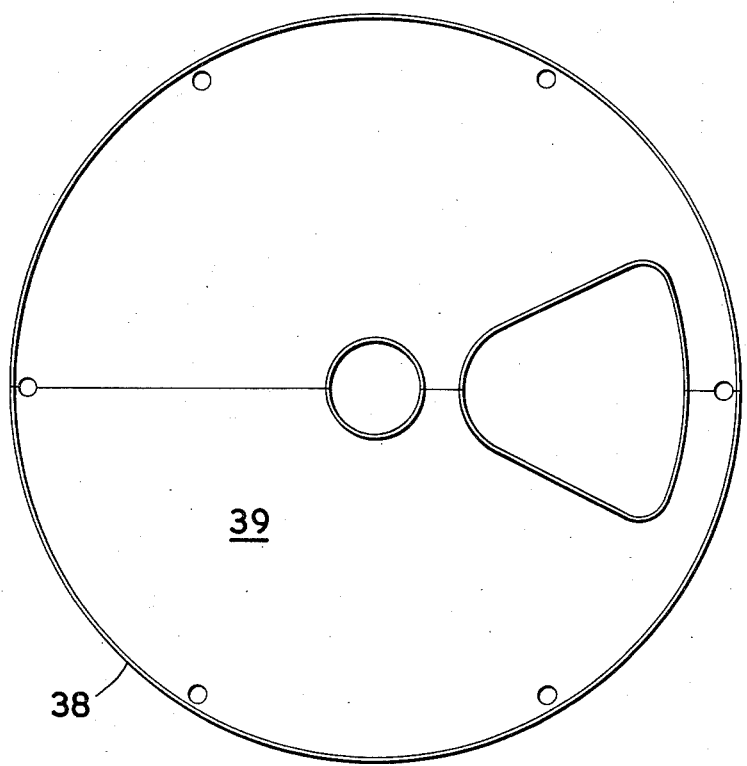
FIG. 5 is a plan of the turntable tray.

The edges of the sector shaped hole 36 and of the turntable 29 are provided with upturned rims 37 and 38 respectively. A polythene tray 39 as shown in FIG. 5 normally covers the turntable 29 and this is provided with a similar rim 40. This prevents small objects rolling over the edge. A shield (not shown) is welded to the bottom of the window extension for the same reason. The rim 38 of the turntable 29 may be provided with upright projections which serve as hand-holds to assist in rotating it. If necessary, the turntable 29 may be rotated by means of an electric motor.

Since a water, gas and electric service unit 52 provided inside the chamber 1 remains fixed relative to apparatus on the turntable 29, there will be a considerable torsion on the connecting pipes 56 and cables 57 which enter the chamber via a central aperture 51 formed in member 30 when the turntable is rotated; this is taken up by using a large bight of cable or flexible tubing for each service, however, a stop (not shown) is also provided inside the chamber so that the turntable can only be turned through one complete revolution.

When the turntable 29 is at rest, a brake 41 is permanently applied to the extension of the rotatable member 30 which projects through the base-plate 5. This may be released by applying pressure to a foot pedal 42 mounted on the lower part of the chamber supporting framework 2.

When a set of chambers is to be used for work with the same radio-active isotope as shown in FIG. 8, it is convenient to be able to transfer material or small items of equipment from one chamber to another. Each of the chambers 1 is therefore provided with a horizontally extending passageway, comprising a length of square section ducting 43 fitted parallel to the window 7 of the chamber and connected to the underside of the base plate 5 of the chamber, by a length of large diameter tubing 44. A small window 45 is provided on the face of the duct at the junction with this tubing 44.

Figure 6:
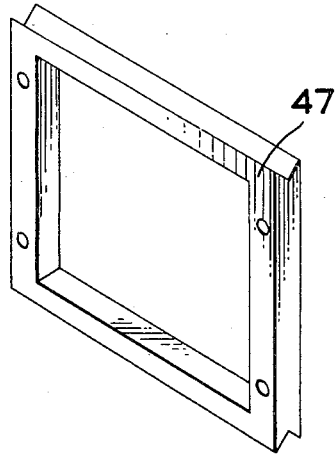
FIG. 6 is an isometric view of a trunking connecting plate.
Figure 7:
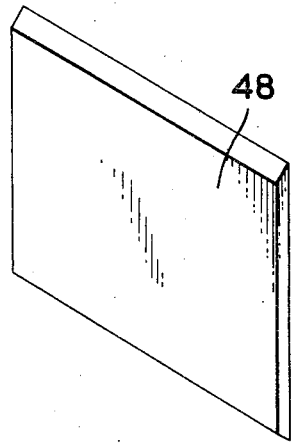
FIG. 7 is an isometric view of a trunking sealing plate.

The ends of the duct 43 are flanged and are provided with grooves 46, the faces of which are ground and into which slide apertured connecting plates 47 or sealing plates 48. The connecting plates 47 (FIG. 6) which are well greased, unite two chambers in an airtight manner, while the sealing plates 48 (FIG. 7) which are similar in outline to the connecting plate but cleft vertically, enable a chamber to be separated from its neighbour without exposing the contaminated inner surface of the duct. The mode of operation is as follows; when it is desired to disconnect a chamber, a plate receiver box (not shown) is attached to the rear of the duct flanges, and sealing plates 48 as a pair, are pushed into position, forcing the connecting plate 47 into the receiver box. When this latter is removed, the chambers can be separated, leaving only the two greased surfaces of the sealing plates exposed. The connecting plate can be replaced when the chambers are rejoined, by a similar procedure. In normal use, bolts pass through the connecting plates and the flanges at the ends of each duct.

Transport of material from one chamber to another is effected by means of a small electrically propelled trolley 53 running in the duct 43. This trolley is driven by an electric motor mounted on one end, the power supply being fed in by a trailing cable which is kept taut by a self-winding reel; this may be housed in a chamber attached to the end of the duct. The trolley is mounted on rubber-tyred wheels 54 and is aligned in the duct 43 by two pairs of similar wheels 55 on the sides of the trolley.

The circular supporting framework 2 for each chamber is constructed of tubular members and is supported on three castors 49 for easy movement; the weight of the chamber and stand when in the working position is taken on three screwjacks 50 so that the chamber cannot be moved. A lower ring 56 of the framework carries the brake pedal 42 which is connected to the turntable brake 41 by a Bowden cable 62.

The inside of the chamber 1 including the turntable 29 is painted with white epoxyresin paint; externally each chamber may be painted a different colour for easy identification in the event of an accident. Although an epoxyresin paint finish has a relatively high resistance to corrosive vapours, a chamber moulded from fibre-glass may be used for work under extreme conditions.

In an alternative arrangement, which may be used when it is not necessary to provide a transfer passageway, the table within the chamber may be held stationary and the chamber rotated about its vertical axis to provide the relative motion required to bring the table opening and the ports in the chamber base plate into register.

We claim:

1. Equipment for use in carrying out operations on or treatment to a toxic substance comprising a gas tight chamber having a wall substantially circular in plan, a base plate and a roof secured to said circular wall, a window of transparent substance in the wall, glove ports in the window, a table within the chamber below the level of the glove ports, means defining a transfer port in the table and an opening and closing door in the base plate registrable with said transfer port by relative rotation between said table and said base plate.

2. Equipment for use in carrying out operations on or treatments to a toxic substance comprising a gas tight chamber having a wall substantially circular in plan, a base plate and a roof secured to said circular wall, a window of transparent substance in the wall, glove ports in the window, an opening and closing door in said base plate, a turntable below the level of the glove ports rotatable about the vertical central axis of the chamber and means defining a transfer port in the table adapted to register with said opening and closing door in the base plate.

3. Equipment for use in carrying out operations on or treatments to a toxic substance comprising a gas tight chamber having a wall substantially circular in plan, a base plate and a roof secured to said circular wall, a window of transparent substance in the wall, glove ports in the window, a turntable below the level of the glove ports rotatable about the vertical central axis of the chamber means defining a transfer port in the table, an opening and closing door in said base plate, a horizontally extending tubular passageway under the base plate and a transfer passage between said passageway and said opening and closing door in the base plate.

4. Equipment as claimed according to claim 3 wherein the horizontally extending passageway has grooved end flanges, end sealing plates of dovetail cross-sectional shape received in said grooved end flanges.

5. A set of equipments for use in carrying out operations on or treatments to a toxic substance comprising a plurality of gas tight chambers connected in series each having a wall substantially circular in plan, a base plate and a roof secured to said circular wall, a window of transparent substance in the wall, glove ports in the window, a turntable below the level of the glove-ports rotatable about the vertical axis of the chamber, an opening and closing door in said base plate, means defining a transfer port in the table, a horizontal tubular passageway under the base plate, a transfer passage between said passageway and said opening and closing door in the base plate registrable with said transfer port and connecting means between contiguous end surfaces of each passageway in the series to form a common passageway.

6. A set of equipment as claimed according to claim 5 wherein the connecting means comprises an apertured rectangular plate, a flange at the ends of each passageway having grooves receiving the parallel sides of the rectangular plate.

References Cited in the file of this patent
UNITED STATES PATENTS
2,786,740     Taylor _____ Mar. 26, 1957